Nov. 23, 1965

W. E. DION 3,219,926

TACHOMETER RESPONSIVE TO IGNITION PULSES
UTILIZING A ZENER DIODE-INDUCTOR FILTER

Filed Sept. 15, 1960

INVENTOR.

Warren E. Dion

BY

Paul J. Ethington

ATTORNEY

United States Patent Office 3,219,926
Patented Nov. 23, 1965

3,219,926
TACHOMETER RESPONSIVE TO IGNITION PULSES UTILIZING A ZENER DIODE-INDUCTOR FILTER
Warren E. Dion, Bristol, Conn., assignor to General Motors Corporation, Detroit, Mich., a corporation of Delaware
Filed Sept. 15, 1960, Ser. No. 56,242
3 Claims. (Cl. 324—70)

This invention relates to an electrical tachometer and more particularly to a tachometer circuit adapted for use with the ignition system of a vehicle engine.

The rotational speed of the crankshaft of an engine may be determined by measuring the repetition rate of pulses in the primary circuit of the engine ignition system. Various devices are utilized for detecting this pulse repetition frequency but one of the most convenient circuits employed is a capacitor and diode arrangement commonly referred to as a diode pump circuit. In the diode pump, a capacitor is placed across the pulse source and this capacitor is provided with separate charging and discharging paths as determined by the polarity of a pair of diodes. A meter in one of these paths will indicate the charging or discharging current of the capacitor and this current will be proportional to the pulse repetition rate, so long as the pulse height remains constant and the pulse width is sufficient to permit the capacitor to charge substantially completely.

However, a diode pump circuit cannot be directly connected to an engine ignition system due to the character of the pulses produced in the primary circuit. Usually, the primary includes a series resonant circuit formed by the primary winding of the ignition coil and the capacitor which is connected across the breaker points. This resonant circuit results in high amplitude oscillations which are superimposed on what would otherwise be a clean rectangular waveform of an amplitude equal to the battery voltage. This, of course, is not compatible with the diode pump circuit since the capacitor could charge and discharge during the oscillatory portion of each pulse, producing erroneous indications. A further undesirable characteristic is that the battery voltage in the primary circuit will not remain constant, but will vary as the operating conditions of the vehicle are changed. Thus, in order to utilize a diode pump as a tachometer, some means must be provided for removing the oscillatory portion of the waveform and for eliminating the effect of variations in battery voltage so that a rectangular waveform of constant height is obtained to drive the capacitor-diode integrating circuit.

It is therefore the principal object of this invention to provide an improved electric tachometer for use with the ignition system of an internal combustion engine. Another object is to provide an improved input circuit for a diode pump circuit so that the circuit may be utilized to measure the pulse repetition rate in an engine ignition system. A further object is to provide a simple and inexpensive circuit for measuring the repetition rate of a rectangular waveform of variable amplitude which has an oscillatory signal superimposed thereon.

In accordance with this invention, the above and other objects are accomplished by utilizing a series circuit comprised of an inductor and a Zener diode adapted to be connected to the primary of an engine ignition system. The Zener diode is selected to break down in the backward direction at a voltage that is substantially less than the vehicle's minimum battery voltage under the most adverse conditions. The time constant of the inductor and Zener diode is very short prior to the breakdown, but then changes upon breakdown and becomes very long due to the low back resistance of the diode in this condition. This changing or two-valued time constant will allow the voltage appearing across the diode to follow the steep leading edge of the pulses in the primary circuit but not the oscillatory portion appearing thereafter. Accordingly, a rectangular waveform of constant amplitude will be provided. If a diode pump circuit arrangement is connected across the Zener diode, then a relatively precise indication of engine speed is obtained.

The novel features characteristic of this invention are set forth in the appended claims. The invention may best be understood by the following description of illustrative embodiments thereof, when read in conjunction with the accompanying drawing, in which:

Figure 1:
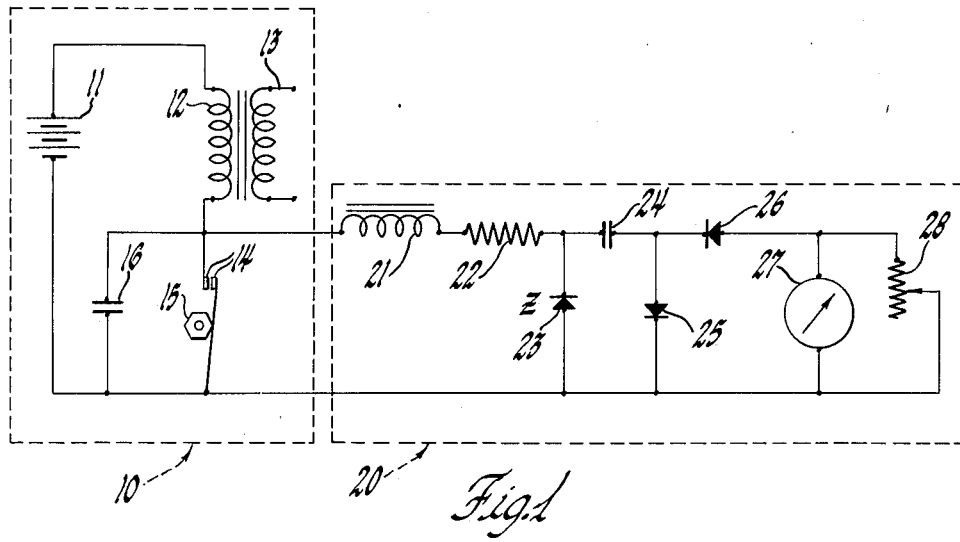
FIGURE 1 is a schematic diagram of a tachometer circuit incorporating the principal features of the invention.

With reference to FIGURE 1, there is shown a portion of an ignition circuit 10 of the type typically used in vehicle engines. The ignition circuit 10 includes a voltage source 11 which would normally include the storage battery and generator of the vehicle. Connected across the voltage source 11 is a primary winding 12 of an igniiton coil. The ignition coil would usually include a secondary winding 13, and across this secondary would be connected a distributor circuit, not shown. A pair of breaker points 14 are connected in series with the primary winding 12 and these breaker points are operated by a cam 15 driven by the distributor shaft. A capacitor 16 is connected across the breaker points 14 to prevent arcing.

Also connected across the breaker points 14 is an electric tachometer circuit 20. This circuit includes an inductor 21 which has a current limiting resistor 22 and a Zener diode 23 connected in series therewith. The Zener diode is reversed in polarity with respect to the source 11 so that it can conduct only in the the backward direction. A capacitor 24 and a pair of diodes 25 and 26 are connected in series-parallel combination across the Zener diode. The diode 25 provides a charging path for the capacitor 24 while the diode 26 provides the discharge path. A sensitive current indicating meter 27 is connected in series with the diode 26 so that it is responsive to the discharge current of the capacitor 24. A variable resistor 28 is connected across the meter 27 for calibration purposes.

Figure 2:
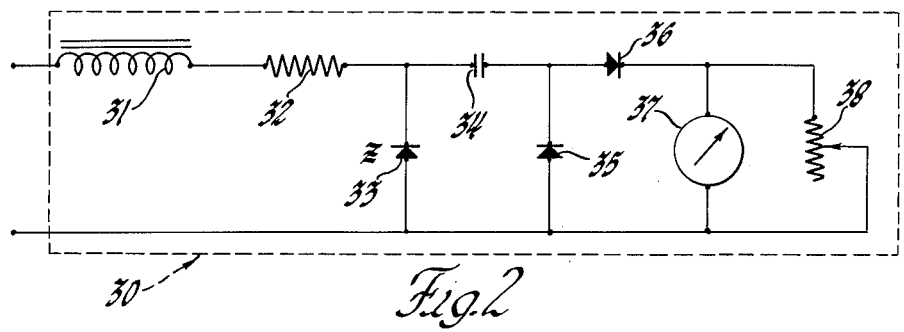
FIGURE 2 is a schematic diagram of a modification of the tachometer circuit of FIGURE 1.

In FIGURE 2 there is shown a modification of the tachometer circuit of FIGURE 1. A tachometer circuit 30, also adapted to be connected across the breaker points of an ignition system, is shown comprising a series circuit which includes an inductor 31, a resistor 32, and a Zener diode 33 as set forth above. A capacitor 34 is connected across the Zener diode and in series with this capacitor is a charging and discharging arrangement comprising a pair of diodes 35 and 36. A meter 37, shunted by a variable resistor 38, is provided in circuit with the diode 36. It is noted that the diodes 35 and 36 are reversed in polarity with respect to the corresponding diodes 25 and 26 in the circuit of FIGURE 1. This allows the capacitor 34 to charge through the meter 37 and discharge through the parallel path including the diode 35.

Figure 3:
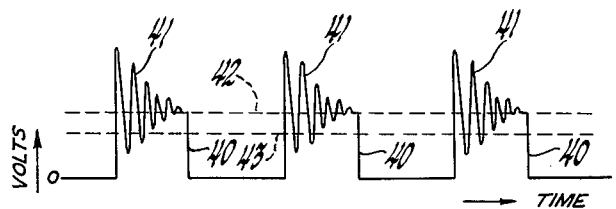
FIGURE 3 is a graphic representation of the voltage waveform appearing in the primary circuit of the ignition system of FIGURE 1.

With reference to FIGURE 3, a graphic representation of the voltage waveform which would appear across the breaker points 14 in the circuit of FIGURE 1 is illustrated. This waveform includes a series of positive pulses 40, each having superimposed thereon an oscillatory signal 41 which is of the frequency of the series resonant circuit including the leakage reactance of the primary winding 12 and the capacitor 16. The oscillatory signal decays toward a level 42 which is equal to that of the source 11 or the battery voltage. This oscillatory signal, although shown to be of relatively small amplitude, may include spikes which are much greater in magnitude than the battery voltage. The Zener diode 23 is selected to have a back breakdown voltage of much less than the battery voltage. For example, the breakdown voltage may correspond to the level 43 of FIGURE 3.

In the operation of the circuit of FIGURE 1, rotation of the cam 15 will result in a voltage across the breaker points 14 in the form of a pulse train having a general waveform as shown in FIGURE 3 and having a repetition rate related to rotational speed of the crankshaft of the engine. This voltage is applied across the series circuit including the inductor 21 and the Zener diode 23. The leading edge of each of the pulses 40 will tend to produce current through this series circuit, but initially little current will flow due to the high back resistance of the diode. In other words, the time constant of the series circuit including the inductor 21 and the Zener diode 23 will be relatively short due to the large back resistance of the Zener diode. Thus the voltage across the Zener diode will follow the voltage across the breaker points with relatively little lag. However, once the breakdown level 43 is reached, a large current can flow in the backward direction through the Zener diode 23. The time constant of the series circuit, being related to the inductance divided by the series resistance, will exhibit a significant increase at this point. The back resistance of the Zener diode after breakdown is very small and so the current flowing in this circuit will be relatively large, being ultimately limited by the current limiting resistor 22. Due to the long time constant, the current flowing in the series circuit will not follow the relatively high frequency oscillations 41. Therefore, the voltage appearing across the Zener diode will consist of pulses having sharp leading edges, but having flat tops, following the level 43. This is the voltage which is impressed across the capacitor-diode circuit arrangement. The capacitor 24 will immediately start to charge toward the level 43 through the diode 25. During the charging of the capacitor 24, a decreased current will flow through the Zener diode 23. The voltage across the charged capacitor 24 will remain at the level 43 until the end of each pulse 40 and will then discharge through the diode 26 and the meter 27. The pulse width of each pulse 40, although variable, is always much greater than the time necessary for the capacitor 24 to charge. The interval between the pulses 40 is also variable, but always greatly exceeds the time required by the capacitor 24 to discharge. The average magnitude of the current flowing through the meter 27 will thus be related to the repetition rate of the pulses or to crankshaft speed, regardless of battery voltage or engine operating conditions. Accordingly, the meter 27 may be calibrated to read directly in revolutions per minute.

It will be appreciated that with the circuit of FIGURE 1, the charging and discharging constants are of different values due to the inherent resistance of the meter 27 and the shunt resistor 28 compared to the diode 25. With the circuit of FIGURE 2, the charging and discharging time constants may be mutually interchanged to favor an unequal ratio of on-time to off-time of the breaker points 14. With this last arrangement, the capacitor 34 may be of a larger value, allowing complete charging and discharging during the same time cycle thus permitting the meter 37 to be a cheaper and less sensitive instrument.

While the values of the circuit components in this electrical tachometer may vary with the design, the following circuit specifications of a particular embodiment are given by way of example:

| | |
|---|---|
| Inductor 21 | 100 millihenry. |
| Resistor 22 | 220 ohm. |
| Zener diode 23 | Type IN1314. |
| Capacitor 24 | 0.47 microfarad. |
| Diodes 25 and 26 | Type IN34A. |
| Resistor 28 | 1000 ohm. |
| Meter 27 | 1 milliampere. |

Although this invention has been described in terms of illustrative embodiments, it is of course understood that various modifications may be made by persons skilled in the art. Thus it is contemplated that the appended claims will cover any such modifications as fall within the true scope of the invention.

I claim:

1. A tachometer adapted to be connected across a source of repetitive voltage pulses which include fundamental and high frequency components, the tachometer comprising a Zener diode connected across the source in a series circuit which includes inductance and resistance having a time constant large enough to effectively suppress the high frequency components, the Zener diode being connected so the voltage pulses are applied thereto in the reverse direction and having a reverse breakdown voltage lower than the amplitude of said pulses so that the series circuit exhibits a small time constant until the Zener diode breaks down and a large time constant after the Zener diode breaks down whereby each of the voltage pulses across the Zener diode has a leading edge corresponding to that of the pulses from said source and has a constant pulse amplitude, a capacitor, a parallel circuit including a unidirectionally conductive device in one branch and an impedance element in another branch for providing separate charging and discharging paths for the capacitor, indicating means connected in one of said branches and being responsive to average current, said parallel circuit being connected across the Zener diode through said capacitor, said resistance and the time constant of said inductance and resistance being small enough in relation to the value of said capacitor so that the capacitor is fully charged during each pulse and is fully discharged between pulses whereby the current flow through the indicating means has an average value corresponding to the repetition rate of said pulses.

2. In a tachometer for use with a spark ignition engine having an ignition system with breaker points which develop repetitive voltage pulses each having a steep leading edge and having high frequency oscillation superimposed thereon, the tachometer comprising a Zener diode is a series circuit including inductance and resistance and adapted to be connected across the breaker points, the inductance and resistance having a time constant large enough to effectively suppress the high frequency oscillation, the Zener diode being connected so the voltage pulses are applied thereto in the reverse direction and having a reverse breakdown voltage lower than the amplitude of said pulses so that the series circuit exhibits a small time constant until the Zener diode breaks down and a large time constant after the Zener diode breaks down whereby each voltage pulse across the Zener diode has a steep leading edge and a constant pulse amplitude, a capacitor and a first diode connected in series across said Zener diode with the first diode connected so the voltage pulses are applied thereto in the forward direction to provide a charging path for said capacitor, and a second diode and an average current indicating means connected in series across said first diode with the second diode being connected so that the voltage pulses are applied thereto in the reverse direction to provide a discharging path for said capacitor, said resistance and the time constant of said inductance and resistance being small enough in relation to the value of said capacitor so that the capacitor is fully charged during each pulse and is fully discharged between pulses whereby the capacitor discharging current flows through the indicating means and has an average value corresponding to the repetition rate of said pulses.

3. In a tachometer for use with a spark ignition engine having an ignition system with breaker points which develop repetitive voltage puses each having a steep leading edge and having high frequency oscillation superimposed thereon, the tachometer comprising a Zener diode in a series circuit including inductance and resistance and adapted to be connected across the breaker points, the inductance and resistance having a time constant large enough to effectively suppress the high frequency oscillation, the Zener diode being connected so the voltage pulses are applied thereto in the reverse direction and having a reverse breakdown voltage lower than the amplitude of said pulses so that the series circuit exhibits a small time constant before the Zener diode breaks down and a large time constant after the Zener diode breaks down whereby each voltage pulse across the Zener diode has a steep leading edge and a constant pulse amplitude, a capacitor, a first diode and an average current indicating means connected in series across the Zener diode with the first diode being connected so that the voltage pulses are applied thereto in the forward direction to provide a charging path for said capacitor, a second diode connected across the capacitor and Zener diode with second diode connected so the voltage pulses are applied thereto in the reverse direction to provide a discharging path for said capacitor, said resistance and the time constant of said inductance and resistance being small enough in relation to the value of said capacitor so that the capacitor is fully charged during each pulse and fully discharged between pulses whereby the capacitor charging current flows through the indicating means and has an average value corresponding to the repetition rate of said pulses.

References Cited by the Examiner

UNITED STATES PATENTS

| 2,335,247 | 11/1943 | Hanson | 324—70 |
| 2,829,282 | 4/1958 | Hughes et al. | 307—88.5 |
| 2,983,868 | 5/1961 | Silberbach et al. | 324—70 |
| 3,005,155 | 10/1961 | Faria | 324—70 |

FOREIGN PATENTS

| 1,084,265 | 7/1954 | France. |
| 843,152 | 8/1960 | Great Britain. |

OTHER REFERENCES

A Transistorized Tachometer, Small et al., Radio & TV News, dated January 1959, pp. 42 and 43.

Auto Tachometer Uses Transistor, by James Cowan, article in Electronics, August 15, 1958, pp. 92 and 94.

Transistor Frequency Meters, L. R. Blake and A. R. Eames, Electronic Engineering, August 1956.

WALTER L. CARLSON, *Primary Examiner.*

SAMUEL BERNSTEIN, FREDERICK M. STRADER, *Examiners.*